(12) United States Patent
Hsu et al.

(10) Patent No.: US 10,657,048 B2
(45) Date of Patent: May 19, 2020

(54) GARBAGE COLLECTION METHOD FOR DATA STORAGE DEVICE

(71) Applicant: Silicon Motion, Inc., Jhubei, Hsinchu County (TW)

(72) Inventors: Hong-Jung Hsu, Jhubei (TW); Chun-Chieh Kuo, Jhubei (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 15/783,953

(22) Filed: Oct. 13, 2017

(65) Prior Publication Data

US 2018/0129602 A1 May 10, 2018

(30) Foreign Application Priority Data

Nov. 10, 2016 (TW) .............................. 105136580 A

(51) Int. Cl.
*G06F 12/02* (2006.01)
*G06F 3/06* (2006.01)
(52) U.S. Cl.
CPC .......... *G06F 12/0261* (2013.01); *G06F 3/068* (2013.01); *G06F 3/0608* (2013.01); *G06F 3/0647* (2013.01); *G06F 3/0652* (2013.01); *G06F 3/0679* (2013.01); *G06F 3/0631* (2013.01); *G06F 12/0269* (2013.01); *G06F 2212/1044* (2013.01); *G06F 2212/7201* (2013.01); *G06F 2212/7205* (2013.01)
(58) Field of Classification Search
CPC .... G06F 3/0608; G06F 3/0647; G06F 3/0652; G06F 3/068; G06F 12/0261; G06F 12/0269; G06F 3/0679; G06F 3/0631; G06F 12/02; G06F 3/06

USPC .......................................... 711/103, 207, 165
See application file for complete search history.

(56) References Cited

U.S. PATENT DOCUMENTS

| 6,810,037 | B1 * | 10/2004 | Kalapathy | ............... H04L 47/50 370/392 |
| 9,383,924 | B1 * | 7/2016 | Fullbright | ............. G06F 3/0608 |
| 2011/0029715 | A1 | 2/2011 | Hu et al. | |
| 2012/0079171 | A1 * | 3/2012 | Ju | ....................... G06F 12/0246 711/103 |
| 2012/0239854 | A1 * | 9/2012 | Hsueh | ................. G06F 12/0866 711/103 |
| 2012/0284587 | A1 * | 11/2012 | Yu | ......................... G06F 3/0608 714/773 |

(Continued)

FOREIGN PATENT DOCUMENTS

| TW | 201122812 A1 | 7/2011 |
| TW | 201510723 A | 3/2015 |

*Primary Examiner* — Pierre Miche Bataille

(57) ABSTRACT

A garbage collection method for a data storage device includes steps of: entering a background mode from a foreground mode; selecting a plurality of source data blocks from a plurality of in-use data blocks; dividing a mapping table into a plurality of sub-mapping tables and selecting one of the sub-mapping tables as a target sub-mapping table, wherein the target sub-mapping table is used to manage one of the source data blocks; selecting a destination data block from a plurality of spare data blocks; and sequentially updating a correspondence relationship of data stored in the target sub-mapping table from the source data blocks to the destination data block, wherein the updating comprises copying the data stored in the source data blocks to the destination data block.

16 Claims, 7 Drawing Sheets

(56) References Cited

U.S. PATENT DOCUMENTS

| | | | | |
|---|---|---|---|---|
| 2014/0223079 A1* | 8/2014 | Zhang | ................ | G06F 12/0246 |
| | | | | 711/103 |
| 2014/0351498 A1* | 11/2014 | Hsueh | ................ | G06F 12/0866 |
| | | | | 711/103 |
| 2015/0324284 A1* | 11/2015 | Kim | ................... | G06F 12/0246 |
| | | | | 711/103 |
| 2017/0262173 A1* | 9/2017 | Song | .................... | G06F 3/0611 |

* cited by examiner

302

| | Block | Page | LBA |
|---|---|---|---|
| | 1 | 0 | 0 |
| x | 1 | 1 | 2 |
| x | 1 | 2 | 11 |
| x | 1 | 3 | 12 |
| x | 1 | 4 | 21 |
| x | 1 | 5 | 22 |
| | 1 | 6 | 23 |
| x | 1 | 7 | 14 |
| x | 1 | 8 | 3 |
| x | 1 | 9 | 5 |
| x | 1 | 10 | 16 |
| x | 1 | 11 | 17 |

304

| | Block | Page | LBA |
|---|---|---|---|
| | 20 | 0 | 2 |
| | 20 | 1 | 1 |
| x | 20 | 2 | 22 |
| | 20 | 3 | 11 |
| | 20 | 4 | 12 |
| | 20 | 5 | 10 |
| x | 20 | 6 | 9 |
| | 20 | 7 | 8 |
| x | 20 | 8 | 7 |
| x | 20 | 9 | 6 |
| | 20 | 10 | 14 |
| | 20 | 11 | 3 |

306

| | Block | Page | LBA |
|---|---|---|---|
| | 300 | 0 | 24 |
| | 300 | 1 | 4 |
| | 300 | 2 | 5 |
| | 300 | 3 | 19 |
| | 300 | 4 | 6 |
| | 300 | 5 | 30 |
| | 300 | 6 | 31 |
| x | 300 | 7 | 13 |
| | 300 | 8 | 18 |
| x | 300 | 9 | 15 |
| | 300 | 10 | 20 |
| | 300 | 11 | 16 |

308

| | Block | Page | LBA |
|---|---|---|---|
| x | 4000 | 0 | 25 |
| | 4000 | 1 | 17 |
| | 4000 | 2 | 24 |
| | 4000 | 3 | 7 |
| | 4000 | 4 | 9 |
| | 4000 | 5 | 25 |
| | 4000 | 6 | 13 |
| | 4000 | 7 | 15 |
| | 4000 | 8 | 21 |
| | 4000 | 9 | 22 |
| | 4000 | 10 | 24 |
| | 4000 | 11 | 10000 |

322

| LBA | Block | Page |
|---|---|---|
| 0 | 1 | 0 |
| 1 | 20 | 1 |
| 2 | 20 | 0 |
| 3 | 20 | 11 |
| 4 | 300 | 1 |
| 5 | 300 | 2 |
| 6 | 300 | 4 |
| 7 | 4000 | 3 |
| 8 | 20 | 7 |
| 9 | 4000 | 4 |
| 10 | 20 | 5 |
| 11 | 20 | 3 |
| 12 | 4000 | 0 |
| 13 | 4000 | 6 |
| 14 | 20 | 10 |
| 15 | 4000 | 7 |

324

| LBA | Block | Page |
|---|---|---|
| 16 | 300 | 11 |
| 17 | 4000 | 1 |
| 18 | 300 | 8 |
| 19 | 300 | 3 |
| 20 | 300 | 10 |
| 21 | 4000 | 8 |
| 22 | 4000 | 9 |
| 23 | 1 | 6 |
| 24 | 4000 | 2 |
| 25 | 4000 | 5 |
| 26 | FF | FF |
| 27 | FF | FF |
| 28 | FF | FF |
| 29 | FF | FF |
| 30 | 300 | 5 |
| 31 | 300 | 6 |

326

| LBA | Block | Page |
|---|---|---|
| 10000 | 4000 | 11 |
| 10001 | FF | FF |
| 10002 | FF | FF |
| 10003 | FF | FF |
| 10004 | FF | FF |
| 10005 | FF | FF |
| 10006 | FF | FF |
| 10007 | FF | FF |
| 10008 | FF | FF |
| 10009 | FF | FF |
| 10010 | FF | FF |
| 10011 | FF | FF |
| 10012 | FF | FF |
| 10013 | FF | FF |
| 10014 | FF | FF |
| 10015 | FF | FF |

| | Block | Page | LBA |
|---|---|---|---|
| s | 1 | 0 | 0 |
| x | 1 | 1 | 2 |
| x | 1 | 2 | 11 |
| x | 1 | 3 | 12 |
| x | 1 | 4 | 21 |
| x | 1 | 5 | 22 |
| | 1 | 6 | 23 |
| x | 1 | 7 | 14 |
| x | 1 | 8 | 3 |
| x | 1 | 9 | 5 |
| x | 1 | 10 | 16 |
| x | 1 | 11 | 17 |

304

| | Block | Page | LBA |
|---|---|---|---|
| s | 20 | 0 | 2 |
| s | 20 | 1 | 1 |
| x | 20 | 2 | 22 |
| s | 20 | 3 | 11 |
| s | 20 | 4 | 12 |
| s | 20 | 5 | 10 |
| x | 20 | 6 | 9 |
| s | 20 | 7 | 8 |
| x | 20 | 8 | 7 |
| x | 20 | 9 | 6 |
| s | 20 | 10 | 14 |
| s | 20 | 11 | 3 |

306

| | Block | Page | LBA |
|---|---|---|---|
| | 300 | 0 | 24 |
| s | 300 | 1 | 4 |
| s | 300 | 2 | 5 |
| | 300 | 3 | 19 |
| s | 300 | 4 | 6 |
| | 300 | 5 | 30 |
| | 300 | 6 | 31 |
| x | 300 | 7 | 13 |
| | 300 | 8 | 18 |
| x | 300 | 9 | 15 |
| | 300 | 10 | 20 |
| | 300 | 11 | 16 |

308

| | Block | Page | LBA |
|---|---|---|---|
| x | 4000 | 0 | 25 |
| | 4000 | 1 | 17 |
| | 4000 | 2 | 24 |
| | 4000 | 3 | 7 |
| | 4000 | 4 | 9 |
| | 4000 | 5 | 25 |
| | 4000 | 6 | 13 |
| | 4000 | 7 | 15 |
| | 4000 | 8 | 21 |
| | 4000 | 9 | 22 |
| | 4000 | 10 | 24 |
| | 4000 | 11 | 10000 |

310

| Block | Page | LBA |
|---|---|---|
| 60000 | 0 | 0 |
| 60000 | 1 | 2 |
| 60000 | 2 | 1 |
| 60000 | 3 | 11 |
| 60000 | 4 | 12 |
| 60000 | 5 | 10 |
| 60000 | 6 | 8 |
| 60000 | 7 | 14 |
| 60000 | 8 | 3 |
| 60000 | 9 | 4 |
| 60000 | 10 | 5 |
| 60000 | 11 | 6 |

FIG. 4

| LBA | Block | Page |
|---|---|---|
| 0 | 1 | 0 |
| 1 | 20 | 1 |
| 2 | 20 | 0 |
| 3 | 20 | 11 |
| 4 | 300 | 1 |
| 5 | 300 | 2 |
| 6 | 300 | 4 |
| 7 | 4000 | 3 |
| 8 | 20 | 7 |
| 9 | 4000 | 4 |
| 10 | 20 | 5 |
| 11 | 20 | 3 |
| 12 | 4000 | 0 |
| 13 | 4000 | 6 |
| 14 | 20 | 10 |
| 15 | 4000 | 7 |

322

↓ update

| LBA | Block | Page |
|---|---|---|
| 0 | 60000 | 0 |
| 1 | 60000 | 2 |
| 2 | 60000 | 1 |
| 3 | 60000 | 8 |
| 4 | 60000 | 9 |
| 5 | 60000 | 10 |
| 6 | 60000 | 11 |
| 7 | 4000 | 3 |
| 8 | 60000 | 6 |
| 9 | 4000 | 4 |
| 10 | 60000 | 5 |
| 11 | 60000 | 3 |
| 12 | 60000 | 4 |
| 13 | 4000 | 6 |
| 14 | 60000 | 7 |
| 15 | 4000 | 7 |

|   | 302 |   |   |   |   | 304 |   |   |   | 306 |   |   |   | 308 |   |
|---|---|---|---|---|---|---|---|---|---|---|---|---|---|---|---|
|   | Block | Page | LBA |   | Block | Page | LBA |   | Block | Page | LBA |   | Block | Page | LBA |
| s | 1 | 0 | 0 | s | 20 | 0 | 2 |   | 300 | 0 | 24 | x | 4000 | 0 | 25 |
| x | 1 | 1 | 2 | s | 20 | 1 | 1 | s | 300 | 1 | 4 |   | 4000 | 1 | 17 |
| x | 1 | 2 | 11 | x | 20 | 2 | 22 | s | 300 | 2 | 5 |   | 4000 | 2 | 24 |
| x | 1 | 3 | 12 | s | 20 | 3 | 11 |   | 300 | 3 | 19 | Y | 4000 | 3 | 7 |
| x | 1 | 4 | 21 | s | 20 | 4 | 12 | s | 300 | 4 | 6 | Y | 4000 | 4 | 9 |
| x | 1 | 5 | 22 | s | 20 | 5 | 10 |   | 300 | 5 | 30 |   | 4000 | 5 | 25 |
|   | 1 | 6 | 23 | x | 20 | 6 | 9 |   | 300 | 6 | 31 | Y | 4000 | 6 | 13 |
| x | 1 | 7 | 14 | s | 20 | 7 | 8 | x | 300 | 7 | 13 | Y | 4000 | 7 | 15 |
| x | 1 | 8 | 3 | x | 20 | 8 | 7 |   | 300 | 8 | 18 |   | 4000 | 8 | 21 |
| x | 1 | 9 | 5 | x | 20 | 9 | 6 | x | 300 | 9 | 15 |   | 4000 | 9 | 22 |
| x | 1 | 10 | 16 | s | 20 | 10 | 14 |   | 300 | 10 | 20 |   | 4000 | 10 | 24 |
| x | 1 | 11 | 17 | s | 20 | 11 | 3 |   | 300 | 11 | 16 |   | 4000 | 11 | 10000 |

312

| Block | Page | LBA |
|---|---|---|
| 60001 | 0 | 7 |
| 60001 | 1 | 9 |
| 60001 | 2 | 13 |
| 60001 | 3 | 15 |
|  |  |  |
|  |  |  |
|  |  |  |
|  |  |  |
|  |  |  |
|  |  |  |
|  |  |  |
|  |  |  |

FIG. 6

GARBAGE COLLECTION METHOD FOR DATA STORAGE DEVICE

FIELD OF THE INVENTION

The present invention relates to a technique for data storage, and more particularly to a garbage collection method for a data storage device.

BACKGROUND OF THE INVENTION

A data storage device, in particular a data storage device using a non-volatile storage medium, includes a plurality of data blocks. Each data block includes a plurality of data pages, each data page is for storing data with at least one storage unit, and the storage unit may be 512 B (byte) or preferably 4 KB. Data blocks are also divided into empty data blocks (or spare data blocks) and non-empty data blocks (or in-use data blocks) depending on whether data is stored therein or not. For data management and access, the data storage device needs to establish and store a host-to-flash physical address (H2F) mapping table, which is simply referred to as a mapping table in the present invention. When the data storage device is in operation, the mapping table is copied to a dynamic random access memory (DRAM) to increase the efficiency of data management and access. In addition, depending on the size of recorded content, in general the size of the mapping table is 1/1000 of the data storage capacity of the data storage device. For example, if the size of a data storage device is 256 GB, the size of the corresponding mapping table is 256 MB. Therefore, to store an entire mapping table, the size of the DRAM is preferably greater than or equal to 256 MB.

For a data storage device that is not provided with a DRAM or only provided with a small-sized DRAM (i.e., the DRAM is not large enough to store an entire mapping table), there is a technical need for providing a solution as to how to use static random access memory (SRAM) or small-sized DRAM for data management and access.

SUMMARY OF THE INVENTION

One objective of the present invention is to provide a garbage collection method for a data storage device. The garbage collection method can reduce the number of times for swapping sub-mapping table, and thereby reducing the resources consumed by the data storage device.

The present invention provides a garbage collection method for a data storage device, which includes steps of: entering a background mode from a foreground mode; selecting a plurality of source data blocks from a plurality of in-use data blocks; dividing a mapping table into a plurality of sub-mapping tables and selecting one of the sub-mapping tables as a target sub-mapping table, wherein the target sub-mapping table is used to manage one of the source data blocks; selecting a destination data block from a plurality of spare data blocks; and sequentially updating a correspondence relationship of data stored in the target sub-mapping table from the source data blocks to the destination data block, wherein the updating comprises copying the data stored in the source data blocks to the destination data block.

In summary, in the present invention, because the garbage collection program is performed on the data blocks in accordance with the complete record content of a sub-mapping table, the present invention can effectively reduce the number of times for swapping mapping table and reduce the resource consumed by the data storage device.

BRIEF DESCRIPTION OF THE DRAWINGS

Other advantages, objectives and features of the present invention will become apparent from the following description referring to the attached drawings.

FIG. 3 is a schematic diagram of a flash physical-to-host logical address mapping table for data blocks 302-308;

FIG. 4 is a schematic diagram for illustrating copying of valid data from data blocks 302-308 to data block 310;

FIG. 5 is a schematic diagram for illustrating recording of correspondence of data to be copied to the target sub-mapping table 322 and forming a target sub-mapping table 322';

FIG. 6 is a schematic diagram for illustrating sequential copying of data having logical block addressing values (LBAs) of 0-15 from data block 308 to data block 312.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
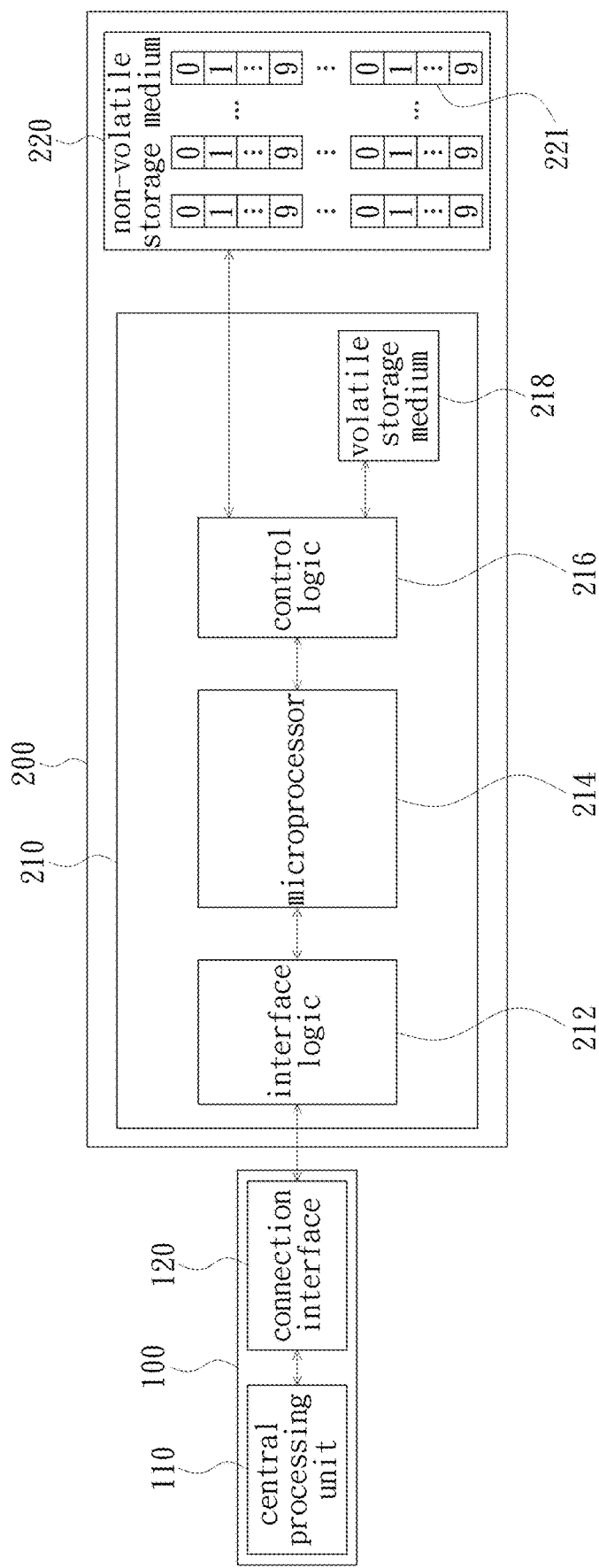
FIG. 1 depicts a data storage device in accordance with an embodiment of the present invention and its electrical coupling relationship with a host.

FIG. 1 depicts a data storage device in accordance with an embodiment of the present invention and its electrical coupling relationship with a host. Referring to FIG. 1, the host 100 mainly includes a central processing unit 110 and a connection interface 120. The connection interface 120 is adapted to electrically couple the data storage device 200 of the present embodiment. The central processing unit 110 is configured to transmit commands and data to the data storage device 200 via the connection interface 120. For example, the central processing unit 110 transmits a read command to the data storage device 200, or transmits a write command and data to be written into the data storage device 200 to the data storage device 200. In the present embodiment, the host 100 is implemented as a computer, a mobile phone, a tablet computer, a camera or other handheld electronic device having computing function.

The data storage device 200 mainly includes a control unit 210 and a non-volatile storage medium 220. The control unit 210 is electrically coupled to the non-volatile storage medium 220 and configured to control the operation (e.g., data access or data erase) of the non-volatile storage medium 220. In the present embodiment, the non-volatile storage medium 220 is, for example, a flash memory, a magnetoresistive random access memory (RANI), a ferroelectric RANI or a resistive RANI (RRANI) capable of long-term data storage. The non-volatile storage medium 220 has a plurality of data blocks (e.g., data block 221), and each of the data blocks has a plurality of data pages. In the present embodiment, each of the data blocks has ten data pages, which are data pages 1-9. The data storage device 200 may further include a small-sized DRAM that is not large enough to store an entire mapping table, and the size of an entire mapping table is preferably greater than or equal to a thousandths of the storage capacity of the non-volatile storage medium 220.

The control unit 210 mainly includes an interface logic 212, a microprocessor 214, a control logic 216 and a volatile storage medium 218, wherein the volatile storage medium 218 is implemented, for example, by static random access memory. The microprocessor 214 of the control unit 210 is electrically coupled to the interface logic 212 and the control logic 216. The control logic 216 is electrically coupled to the non-volatile storage medium 220 and the volatile storage medium 218. The microprocessor 214 is configured to access data in the non-volatile storage medium 220 and the volatile storage medium 218 via the control logic 216. Further, the microprocessor 214 is configured to receive commands or data from the host 100 via the interface logic 212, wherein the aforementioned commands are, for example, a write command, a read command or a flush command.

In the following description, a garbage collection method of the data storage device in accordance with an embodiment of the present invention will be described by an example in which the data storage device 200 is not provided with a small-sized DRAM. However, the garbage collection method of the data storage device of the present invention may also apply to the data storage device 200 provided with a small-sized DRAM, and the present invention is not limited thereto.

Figure 2:
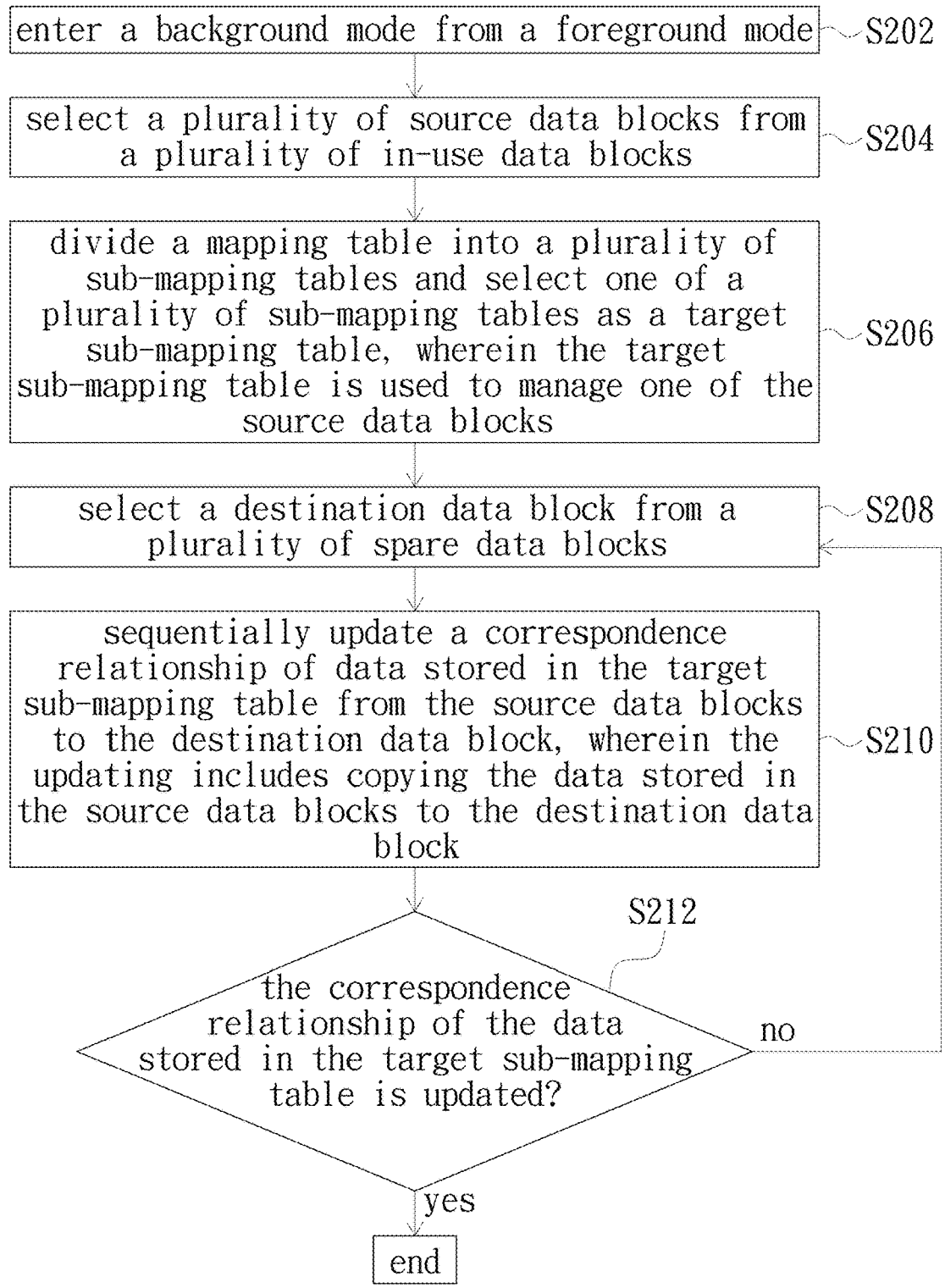
FIG. 2 is a flowchart of a garbage collection method in accordance with an embodiment of the present invention.

FIG. 2 is a flowchart of a garbage collection method in accordance with an embodiment of the present invention. Referring to FIGS. 1 and 2. As shown, first, step S202: entering a background mode from a foreground mode. Specifically, the data storage device 200 would enter the background mode from the foreground mode when the host 100 stops sending commands or data, or the number of spare data blocks in the non-volatile storage medium 220 is lower than a threshold, or the power state is switched into a power saving state or other specific state. The non-volatile storage medium 220 includes a plurality of data blocks, for example, 65,536 data blocks, which are data blocks #0 to #65535. The data blocks #0 to #59999 are in-use data blocks, and the data block #60000 to #65535 are spare data blocks.

Thereafter, step S204: selecting a plurality of source data blocks from the in-use data blocks. Specifically, one of the source data blocks is one of the in-use data blocks having the least valid data count; or one of the source data blocks is one of the in-use data blocks having the most or least erase count; or one of the source data blocks is one of the in-use data blocks having the most or least read count; or the source data blocks are randomly selected from the in-use data blocks; or the source data blocks are sequentially selected from the in-use data blocks according to a serial number. As shown in FIG. 3, the control unit 210 selects a plurality of in-use data blocks, for example, data blocks 302-308 (i.e., data bocks #1, #20, #300 and #4000) out of the 60,000 in-use data blocks (i.e., data blocks #0 to #59999) as the source data blocks. The four source data blocks (i.e., data bocks #1, #20, #300 and #4000) are preferably the first four of the 60,000 in-use data blocks (i.e., data blocks #0 to #59999) having the least valid data count; or the four source data blocks are preferably the first four of the 60,000 in-use data blocks having the least erase count; or the four source data blocks are randomly selected from the 60,000 in-use data blocks; or the four source data blocks are preferably the first four of the 60,000 in-use data blocks having the first four data block numbers (i.e., data bocks #0 to #3) or having the last four data block numbers (i.e., data bocks #59996 to #59999). In addition, the flash physical-to-host logical address (F2H) mapping table of the data blocks 302 to 308 in FIG. 3 is a schematic diagram for explaining the followings, and the present invention is not limited thereto.

Thereafter, step S206: dividing the mapping table into a plurality of sub-mapping tables and selecting one of the sub-mapping tables as a target sub-mapping table. Specifically, the target sub-mapping table is used to manage one of the source data blocks; or the target sub-mapping table is sequentially selected from the sub-mapping tables; or the target sub-mapping table is randomly selected from the sub-mapping tables. In addition, the size of the target sub-mapping table is preferably larger than or equal to the size of the source data block. In addition, preferably, the content of the mapping table is sequentially established in accordance with the index of the logical block addressing (LBA) or established in accordance with the receiving order of the LBA. Assuming that the size of the mapping table is 256 MB and the storage capacity of the volatile storage medium 218 is only 64 KB or if only 64 KB of capacity is reserved for storing a sub-mapping table, the control unit 210 divides the mapping table into 4,000 sub-mapping tables, which are sub-mapping tables #0 to #3999, so that the size of the sub-mapping table is consistent with the storage capacity of the volatile storage medium 218. Assuming that the target sub-mapping table is sequentially selected from the sub-mapping tables, the sub-mapping table being the first to be selected would be sub-mapping table #0 or sub-mapping table #3999. Assuming that the target sub-mapping table is randomly selected from the sub-mapping tables, the sub-mapping table being the first to be selected may be sub-mapping table #1000. Assuming that the content of the mapping table is sequentially established in accordance with the index LBA, the sub-mapping tables 322, 324 and 326 correspond to the sub-mapping tables #0, #1 and #625, respectively. In the correspondence relationship of the flash physical-to-host logical address of the data stored in the data blocks 302 to 308 (in short, a correspondence relationship), the label x indicates invalid data and the label FF indicates that no record of correspondence relationship of the data. Since the LBA of the first record of valid data in the data block 302 is 0 and LBA 0 is corresponded to the first record of the sub-mapping table #0 via the calculation of address, the sub-mapping table 322 would be the first to be selected as the target sub-mapping table. In addition, the calculation of address is prior art, no redundant detail is to be given herein.

Thereafter, step S208: selecting a destination data block from a plurality of spare data blocks. Specifically, the destination data block is randomly selected from the spare data blocks; or the destination data block is sequentially selected from the spare data blocks; or the destination data block is preferably the spare data blocks having the most erase count. Assume that the control unit 210 selects one spare data block, such as data block #60000, as the destination data block 310 from the data blocks #60000 to #65535. If the selection is based on a sequential manner, the data block #60000 or the data area block #65535 is selected as the destination data block 310. If the selection is to choose the one having the most erase count, the data block #65432 may be selected as the destination data block 310. In the following description, data block #60000 is selected as the data block 310 for illustration, but the present invention is not limited thereto.

Thereafter, step S210: sequentially updating the correspondence relationship of the data stored in the target sub-mapping table from the source data blocks to the destination data block, wherein the updating includes copying the data stored in the source data blocks to the destination data block. Referring to FIGS. 3-7. As shown in FIG. 3, the target sub-mapping table 322 records the correspondence relationship of the data having LBAs of 0-15, and these records of data are stored in data blocks 302-308, respectively. As shown in FIG. 4, the valid data (with the label S) of LBAs 0-15 is sequentially copied from the data blocks 302-308 to the data block 310, and the correspondence relationship of the copied data is recorded to the target sub-mapping table 322, which then becomes the target sub-mapping table 322', as shown in FIG. 5. Since the correspondence relationship of invalid or valid data stored in the data block 304 has been updated, the data block 304 does not contain any valid data and therefore can be recovered as a spare data block, thereby achieving the purpose of garbage collection. Conventionally, it would take a long time to swap a sub-mapping table in a data storage device provided with a small-sized DRAM. On the contrary, since the garbage collection method of the present invention performs sub-mapping table swapping after updating the content of the (target) sub-mapping table, not only the purpose of garbage collection is achieved, but also the time for performing garbage collection is reduced as swapping frequency of the mapping table is reduced.

Figure 7:
FIG. 7 is a schematic diagram for illustrating recording of correspondence of data to be copied to the target sub-mapping table 322' and forming a target sub-mapping table 322".

Thereafter, step S212: determining whether the correspondence relationship of the data stored in the target sub-mapping table is updated. If yes, the garbage collecting method of the present invention is ended. If no, step S208 is performed again. In the above example, since the size of the data block 310 is limited, the correspondence table of the data in the target sub-mapping table 322 is only partially updated. Therefore, if the determination at step S212 is no and when the step S208 is re-performed, another data block (e.g., data block #60001) becomes the destination data block as shown in the data block 312. As shown in FIG. 6, the data (with the label Y) having LBAs of 0-15 is sequentially copied from the data block 308 to the data block 312 and the correspondence relationship of the copied data is recorded to the target sub-mapping table 322', which then becomes the target sub-mapping table 322'', as shown in FIG. 7. At this time, the correspondence relationship of the data stored in the target sub-mapping table 322 has been completely updated (that is, the target sub-mapping table 322 has been updated to the target sub-mapping table 322''), and the garbage collection method of the present invention is ended.

When the garbage collection method of the present invention is performed again, since the LBA of the first record of valid data in the data block 302 is 23 and LBA 23 is corresponded to the eighth record of the sub-mapping table #1 via the calculation of address, the sub-mapping table 324 would be the first to be selected as the target sub-mapping table. When the sub-mapping table 324 is updated, the data blocks 302 and 306 may also be recovered as spare data blocks.

It is to be noted that the order of steps S202 to S208 is not so limited as the above; for example, step S206 for selecting the target sub-mapping table may be performed first, and then step S204 for selecting a plurality of source data block and step S208 for selecting a destination data block are performed sequentially; the user can adjust the order of steps according to the actual requirements.

In summary, in the present invention, because the garbage collection program is performed on the data blocks in accordance with the complete record content of a sub-mapping table, the present invention can effectively reduce the number of times for swapping mapping table during the garbage collection process and reduce the resource and time consumed by the data storage device, thereby achieving the objective of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A garbage collection method for a data storage device, comprising:
    entering a background mode from a foreground mode;
    selecting a plurality of source data blocks from a plurality of in-use data blocks;
    dividing a mapping table stored in a non-volatile storage medium of the data storage device into a plurality of sub-mapping tables, storing the plurality of sub-mapping tables in the non-volatile storage medium of the data storage device, and selecting one of the sub-mapping tables from the non-volatile storage medium as a target sub-mapping table, wherein the target sub-mapping table is used to manage one of the source data blocks;
    selecting a destination data block from a plurality of spare data blocks;
    sequentially copying a plurality of valid data stored in the source data blocks to the destination data block;
    updating a correspondence relationship of the copied valid data in the target sub-mapping table from the source data blocks to the destination data block;
    determining the correspondence relationship of the data stored in the target sub-mapping table has been not completely updated;
    selecting another destination data block from the spare data blocks to copy the remaining valid data from the source data blocks to another destination data block until the target sub-mapping table has been completely updated; and
    recovering one of the source data blocks as a spare data block when the one of the source data blocks does not contain any valid data.

2. The garbage collection method according to claim 1, wherein one of the source data blocks is one of the in-use data blocks having an extreme value of valid data count.

3. The garbage collection method according to claim 1, wherein one of the source data blocks is one of the in-use data blocks having an extreme value of erase count.

4. The garbage collection method according to claim 1, wherein one of the source data blocks is one of the in-use data blocks having an extreme value of read count.

5. The garbage collection method according to claim 1, wherein the source data blocks are randomly selected from the in-use data blocks.

6. The garbage collection method according to claim 1, wherein the source data blocks are sequentially selected from the in-use data blocks according to a serial number.

7. The garbage collection method according to claim 1, wherein the target sub-mapping table is sequentially selected from the sub-mapping tables.

8. The garbage collection method according to claim 1, wherein the target sub-mapping table is randomly selected from the sub-mapping tables.

9. The garbage collection method according to claim 1, wherein the destination data block is randomly selected from the spare data blocks.

10. The garbage collection method according to claim 1, wherein the destination data block is sequentially selected from the spare data blocks.

11. The garbage collection method according to claim 1, wherein the destination data block is one of the spare data blocks having an extreme value of erase count.

12. The garbage collection method according to claim 1, wherein the data storage device comprises the in-use data blocks storing valid data and the spare data blocks not storing the valid data.

13. The garbage collection method according to claim 1, wherein the data storage device comprises a dynamic random access memory (DRAM), and a size of the mapping table is larger than a size of the DRAM.

14. The garbage collection method according to claim 1, wherein the background mode is entered from the foreground mode when the data storage device does not receive a command.

15. The garbage collection method according to claim 1, wherein the background mode is entered from the foreground mode when a total number of the spare data blocks is lower than a threshold.

16. The garbage collection method according to claim 1, wherein the background mode is entered from the foreground mode when a power state of the data storage device is changed.

* * * * *